US010262302B2

(12) United States Patent
Kim et al.

(10) Patent No.: US 10,262,302 B2
(45) Date of Patent: Apr. 16, 2019

(54) RECIPE SELECTION SYSTEM WITH BIDIRECTIONAL CALENDAR INTERFACE

(71) Applicant: International Business Machines Corporation, Armonk, NY (US)

(72) Inventors: Minkyong Kim, Scarsdale, NY (US); Min Li, San Jose, CA (US); Clifford A. Pickover, Yorktown Heights, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 14/923,470

(22) Filed: Oct. 27, 2015

(65) Prior Publication Data

US 2017/0116580 A1 Apr. 27, 2017

(51) Int. Cl.
*G06F 3/0482* (2013.01)
*G06Q 10/10* (2012.01)
*G06F 3/0484* (2013.01)

(52) U.S. Cl.
CPC ....... *G06Q 10/1097* (2013.01); *G06F 3/0482* (2013.01); *G06F 3/04842* (2013.01); *G06Q 10/1095* (2013.01)

(58) Field of Classification Search
None
See application file for complete search history.

(56) References Cited

U.S. PATENT DOCUMENTS

| 4,240,721 A | 12/1980 | Drop, Sr. |
| 6,180,934 B1 | 1/2001 | Ishizaki et al. |
| 7,109,445 B2 | 9/2006 | Patterson et al. |
| 8,200,548 B2 | 6/2012 | Wiedl |

(Continued)

FOREIGN PATENT DOCUMENTS

| CA | 2863904 A1 * | 3/2015 | ......... G09B 19/0092 |
| EP | 2638325 A2 | 9/2013 | |

(Continued)

OTHER PUBLICATIONS

Insider Studios with IBM, "We Tested Three Intriguing Recipes From a Hot New Chef (That Isn't Human)," Jan. 7, 2015, Business Insider (Year: 2015).*

(Continued)

*Primary Examiner* — Amanda Gurski
(74) *Attorney, Agent, or Firm* — Patricia B. Feighan

(57) ABSTRACT

Recommending a recipe and monitoring the preparation of the recipe according to a calendar by a computer that receives calendar data that includes one or more of: a date, scheduled appointment times for the date and appointment durations, any special events on the date, and proximity of the date to a holiday. The computer identifies one or more recipes that can be prepared in an available time slot in the calendar, the one or more recipes includes a list of food from a food ingredient list and monitors data, including length of time to complete a preparation step of the selected recipe. Responsive to the length of time increasing by more than a threshold value, the computer adjusts one or more subsequent preparation steps of the selected recipe to compensate for the increase to the length of time and/or the calendar to provide a longer available time for recipe preparation.

20 Claims, 5 Drawing Sheets

(56) References Cited

U.S. PATENT DOCUMENTS

| | | | |
|---|---|---|---|
| 8,335,796 | B2 | 12/2012 | Maeda et al. |
| 8,419,433 | B2 | 4/2013 | Do et al. |
| 8,419,434 | B2 | 4/2013 | Do et al. |
| 8,674,270 | B2 | 3/2014 | Anderson et al. |
| 9,797,873 | B1 * | 10/2017 | Feller ............... G16H 20/60 |
| 2002/0059311 | A1 | 5/2002 | Nishina |
| 2009/0259687 | A1 * | 10/2009 | Do ............... G06F 17/30867 |
| 2011/0055044 | A1 * | 3/2011 | Wiedl ............... G06Q 30/02 705/26.5 |
| 2011/0167100 | A1 | 7/2011 | Brodowski |
| 2012/0322032 | A1 * | 12/2012 | Smith ............... G06Q 30/0633 434/127 |
| 2014/0026762 | A1 | 1/2014 | Riefenstein |
| 2014/0095479 | A1 | 4/2014 | Chang et al. |
| 2015/0161748 | A1 * | 6/2015 | Ratakonda ............... A61L 2/16 705/15 |

FOREIGN PATENT DOCUMENTS

| | | | | |
|---|---|---|---|---|
| WO | | 2012063135 A2 | 5/2012 | |
| WO | WO-2012063135 A2 * | | 5/2012 | ........... H05B 6/6441 |

OTHER PUBLICATIONS

Cuong Pham, Thomas Plotz, and Patrick Olivier; "A Dynamic Time Warping Approach to Real-Time Activity Recognition for Food Preparation," Nov. 10, 2010, International Joint Conference on Ambient Intelligence Proceedings, Ambient Intelligence, pp. 21-30 (Year: 2010).*

IBM, "We Tested Three Intriguing Recipes From a Hot New Chef (That Isn't Human)," Business Insider, Jan. 7, 2015, http://www.businessinsider.com/sc/ibm-chef-watson-2015-1#ixzz3XrC . . . , Printed on Jul. 24, 2015, pp. 1-3.

Fare, "Tools & Resources," Facts and Statistics—Food Allergy Research & Education, http://www.foodallergy.org/facts-and-stats, Printed on Jul. 24, 2015, pp. 1-2.

Higginbotham, "Don't eat that! SRI built a calorie-counting food app that works via a photo snap," gigaom.com, Apr. 3, 2014, https://gigaom.com/2014/04/03/dont-eat-that-sri-built-a-calorie-counting-food-app-that-works-via-a-photo-snap/, Printed on Jul. 24, 2015, pp. 1-5.

Mell et al., "The NIST Definition of Cloud Computing," National Institute of Standards and Technology, U.S. Department of Commerce, Special Publication 800-145, Sep. 2011, pp. 1-7.

* cited by examiner

RECIPE SELECTION SYSTEM WITH BIDIRECTIONAL CALENDAR INTERFACE

BACKGROUND

The present disclosure relates generally to knowledge processing systems and more particularly to calendar event driven recipe selection and modification.

In our busy, modern world with scheduled appointments, dates, and plans, deciding what to make for dinner can be a headache. Finding a recipe that meets dietary requirements and uses ingredients that are currently on hand can be time consuming and difficult.

There exist numerous recipe sources, including books, television programs, videos, and the Internet that provide assistance in preparing a meal and following a recipe, once selected. These sources can provide cooking guidance and assistance to users with varying levels of culinary skill These sources often provide step-by-step instructions. There are even sources, such as "Chef Watson" that can create original recipes from a list of ingredients. These recipe sources force the cook to determine if the selected recipe can be prepared and served in a timeframe that fits into their schedule, and if not, causes the cook to select a different recipe, to modify the recipe to fit into their schedule, or to modify their scheduled appointments, dates and plans.

SUMMARY

Embodiments of the present invention disclose a method, computer program product, and system for recommending a recipe and monitoring the preparation of the recipe according to a calendar. A computer receives calendar data that includes one or more of: a date, scheduled appointment times for the date and appointment durations, any special events on the date, and proximity of the date to a holiday. The computer identifies one or more recipes that can be prepared in an available time slot in the calendar, wherein the one or more recipes includes a list of food from a food ingredient list and monitors data, which includes a length of time to complete a preparation step of the selected recipe. In response to the length of time increasing by more than a threshold value, the computer adjusts one or more of: one or more subsequent preparation steps of the selected recipe to compensate for the increase to the length of time, and the calendar to provide a longer available time for recipe preparation.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
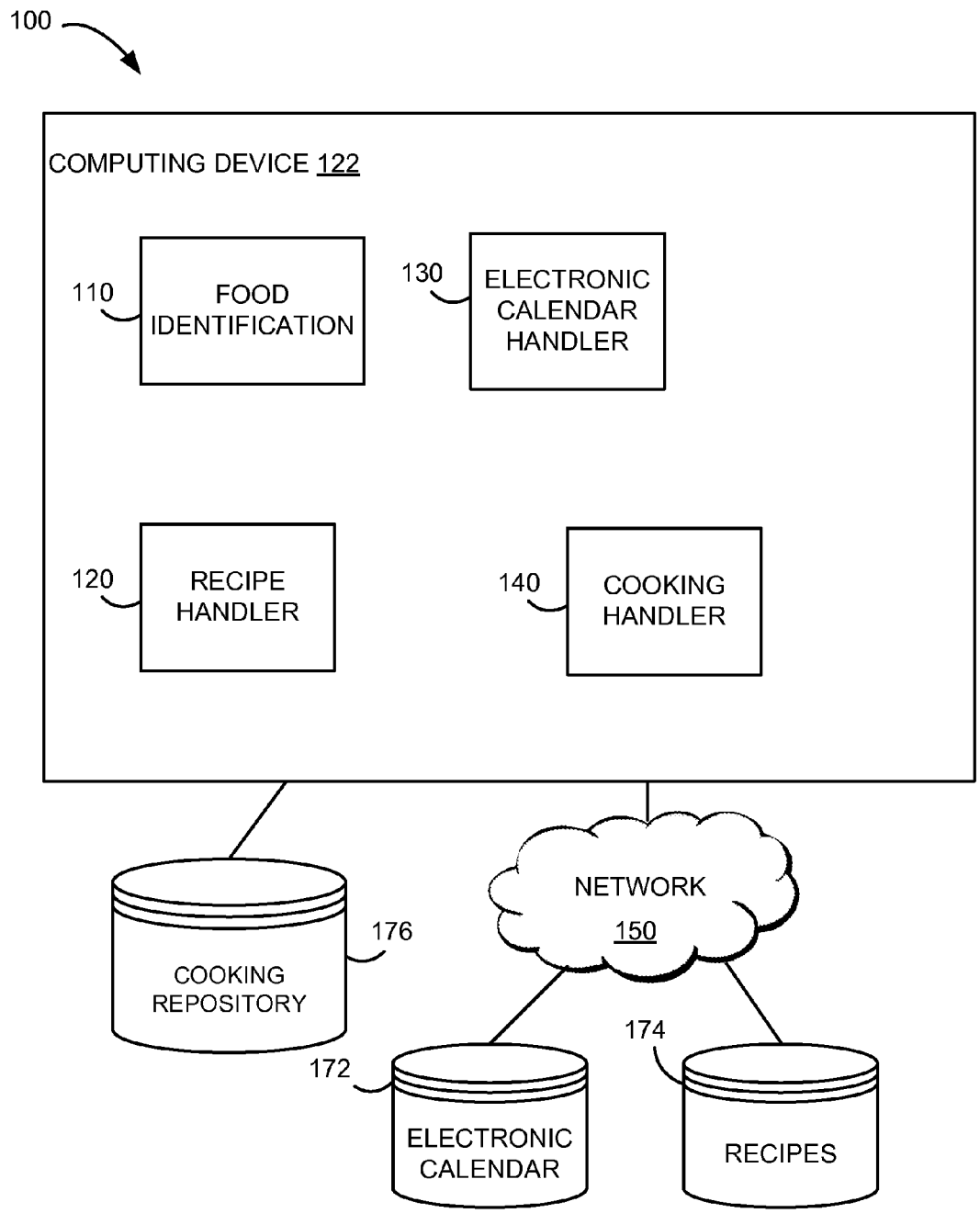
FIG. 1 illustrates a functional block diagram of an exemplary cooking facilitation system, in accordance with an embodiment of the present disclosure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Embodiments of the present disclosure describe a cooking facilitation system that can determine the ingredients on hand and suggest recipes based on those ingredients, but can suggest recipes to prepare based on, among other things, the cook's calendar of scheduled activities, list of invitees, or guests, eating the meal, historical recipe preferences of the cook, the cook's expertise, special calendar events (such as birthdays or holidays), calorie counts, food allergies, and the mood of either the cook or a guest. Embodiments may also monitor the food preparation, suggest ingredient substitutions for missing ingredients, suggest corrections for preparation mistakes, make recipe adjustments if the preparation time will cause calendar conflicts, and make calendar adjustments, whenever possible, to allow for complete recipe preparation and cooking time.

FIG. 1 illustrates a functional block diagram of an exemplary cooking facilitation system 100 in which a computing device 122 is configured, in accordance with an embodiment of the present disclosure. Exemplary cooking facilitation system 100 includes a food identification system 110, a recipe handler 120, a bi-directional electronic calendar handler 130, a cooking handler 140, a personalized cooking repository 176, an electronic calendar 172, and a recipe repository 174, all of which may be stored, for example, on a computer readable storage medium, such as computer readable storage medium (media) 330 (FIG. 3), portable computer readable storage medium (media) 370, and/or RAM(S) 322. The personalized cooking repository 176, electronic calendar 172, and recipe repository 174 may reside within the cooking facilitation system 100 or may be externally accessed through a network 150 (for example, the Internet, a local area network or other, wide area network or wireless network) and network adapter or interface 336. The network may comprise copper wires, optical fibers, wireless transmission, routers, firewalls, switches, gateway computers, and/or edge servers.

Computing device 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 122 may include internal and external hardware components, as depicted and described in further detail with respect to FIG. 3. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

In various embodiments, the food identification system 110 may include a smart counter-top 380 (FIG. 3) with an optical identifier that can, among other functions, recognize foods through image recognition, estimate the weight of an item on the countertop, and estimate the ripeness or color of an item on the countertop. In various embodiments, the smart counter top may include a weight sensor, an electronic tongue, and/or a moisture sensor.

In certain embodiments, the food identification system 110 may include a motion detector (e.g. on the smart counter top 380) that activates the optical identifier. The motion detector may also activate a light source for lighting the field of vision for the optical identifier. In various embodiments, the food identification system 110 may identify the food based on the external appearance of the food. In an embodiment, a physical feature database (not shown) may be used to compare previously stored physical feature images with the physical features of the food being identified. A match probability ranking may be calculated to determine which of the previously stored images is most likely to be the food being identified. In various embodiments, the food identification system 110 can learn to recognize a previously unknown food.

In various embodiments, the food identification system 110 includes a radio frequency identification (RFID) reader or a Universal Product Code (UPC) reader that can identify RFID or UPC tags on foods. In certain embodiments, food items and their weights or quantities can be manually entered into the food identification system 110, for example through a keyboard 360 (FIG. 3), mouse 355, or touch sensitive display 350.

Based on the food identified by the food identification system 110, recipe handler 120 suggests a recipe. In various embodiments, the recipe handler 120 considers one or more recipes from one or more recipe repositories and presents a best match recipe suggestion. In various embodiments, recipe handler 120 may present more than one recipe suggestion. In certain embodiments, the suggested recipes may come from a recipe repository 174 which may be a data store, such as a database, that includes, but is not limited to, recipes, and associated with each recipe: required food items, spices, possible ingredient substitutions, calorie counts, favorable or unfavorable ratings, food images corresponding with each preparation step, cooking gestures corresponding with each preparation step, and estimated preparation time for each preparation step. The recipe repository 174 may be local to the cooking facilitation system 100 or may be network attached and accessed remotely.

In certain embodiments, recipes may come from a personalized cooking repository 176. The personalized cooking repository 176 may be a data store, such as a database, that includes cooking recipes previously cooked by the users of the cooking facilitation system 100. The personalized cooking repository 176 may also include, but is not limited to, required food items, spices, previous ingredient substitutions, previous recipe deviations, calorie counts, a history of each recipe selection, a frequency of each recipe selection, and the user's personal rating for each recipe. The personalized cooking repository 176 may be local to the cooking facilitation system 100 or may be network attached and accessed remotely.

In various embodiments, the personalized cooking repository 176 may include information about the system user including, but not limited to, cooking expertise, food preferences, and recipe restrictions desired, such as a maximum recipe calorie count, ingredients to avoid due to allergy or religious dietary requirements, and any medical dietary requirements (e.g., reduced sugar, reduced fat, or reduced cholesterol). In certain embodiments, the personalized cooking repository 176 may also include the above information for the friends that the user has historically cooked for.

In various embodiments, there may be multiple personalized cooking repositories 176, one for each potential user of the cooking facilitation system 100, for example, all members of a family. In other embodiments, one personalized cooking repository 176 may include multiple sets of information, one for each potential user of the cooking facilitation system 100, for example, all members of a family, such that each family member can have different friends, preferences, and cooking expertise.

In various embodiments, recipe handler 120 may include a user identification feature to locate the appropriate personalized cooking repository 176 and to determine appropriate recipes to suggest. For example, recipe suggestions made for a child can be based on age and may be different than recipe suggestions made for an adult, while both may use the same ingredients. The user may be identified through visual sensors and recognition software, through biometric identification such as fingerprints, or by manual input to the cooking facilitation system 100.

In certain embodiments, recipe handler 120 can suggest recipe step variations based on the system user, for example to make preparation easier for a less experienced cook.

In certain embodiments, recipe handler 120 may also receive recipe preference information directly from the user through an input device such as a touch sensitive display. The directly entered recipe preference information, such a preferred estimated cooking time, upper bound on calories, vegan ingredients only, etc., may be combined with preference information from the personalized cooking repository 176 or may override the preference information in the personalized cooking repository 176 during recipe consideration.

Recipe handler 120 may present recipe suggestions that do not always meet every preference. In various embodiments, recipe handler 120 may highlight any potentially unhealthy or non-preferred elements of the suggested recipe. In certain embodiments, recipe handler 120 may suggest alternative ingredients that remove or lessen any unhealthy or non-preferred elements of the recipe. In various embodiments, recipe handler 120 may also suggest ingredient swapping when, for example, an ingredient for a recipe is not available, an insufficient amount of an ingredient is available, an allergen ingredient is to be avoided, or a healthy alternative is preferred. To make food healthier, recipe handler 120 may suggest adding mixed vegetables that do not change the taste of the finished food, adding honey instead of sugar in cakes or muffins, or decreasing portion sizes to reduce the calorie count.

Recipe handler 120 may also adjust suggested recipes based on identified food weight/volume/ripeness. For example, to add cooking time for a larger piece of meat.

Recipe handler 120 may also suggest a set of recipes that create a full menu, recipes that complement each other, and recipe sets that balance food diversity, taste and nutrition. Recipe handler 120 may also suggest wines or mixed drink recipes that will coordinate well with the suggested food recipe. Alternately, if a particular wine is an input ingredient to the cooking facilitation system 100, recipe handler 120 can suggest food recipes that best compliment the wine.

In certain embodiments, recipe handler 120 may include a recipe generator and utilize an input device, such as a touch sensitive display, that enables the system user to manually list ingredients to create new recipes or revise existing recipes. Recipe handler 120 may also connect, using the input device, to the Internet such that the created or revised recipes can be shared. Recipe handler 120 may also locate recipes that have been shared by others on the Internet. In various embodiments, recipe handler 120 can calculate the calorie count for the created or revised recipe based on the quantities and types of ingredients included in the recipe.

In various embodiments, recipe handler 120 may communicate with electronic calendar handler 130 when considering recipes to suggest. Electronic calendar handler 130 may, in various embodiments, include a bi-directional interface to one or more electronic calendars 172. The electronic calendar 172 may be a data store, such as a database, local to the cooking facilitation system 100 or may be network attached and accessed remotely. The electronic calendar 172 may be a personal calendar or a shared calendar. The electronic calendar 172 may be accessed through any known or future calendar application, either local to the cooking facilitation system 100 or through social media or the Internet, such as the calendars in Lotus Notes, Google Calendar, Microsoft Exchange, Microsoft Outlook, Mozilla Sunbird, Sun Java Calendar Server, Tom's Planner, Ubidesk, Windows Live Mail, Teamwork, Yahoo! Calendar, and TimeBridge. The electronic calendar 172 may include profile information for each contact associated with the electronic calendar 172. In various embodiments, each contact's profile information may include dietary restrictions that can be used by recipe handler 120 when suggesting recipes that will be served to that contact.

Electronic calendar handler 130 may read the electronic calendar 172 and send the information to recipe handler 120. Electronic calendar handler 130 may calculate how much time to allot for recipe preparation and an available time slot in the calendar for recipe preparation based on calendar entries, such as scheduled appointments and appointment durations, and the current time. How much time is allotted for recipe preparation is taken into consideration by recipe handler 120 when presenting recipe suggestions. Additional calendar information passed to recipe handler 120 by electronic calendar handler 130 that may also be taken into consideration includes, but is not limited to, special events noted in the calendar (e.g., an upcoming student exam, which recipe handler 120 can consider to suggest comfort food recipes, an upcoming medical blood test, which recipe handler 120 can consider to suggest restricted ingredient recipes, an anniversary, which recipe handler 120 can consider to suggest a romantic dinner, or movie night with friends, which recipe handler 120 can consider to suggest finger food recipes), large events requiring food preparation (e.g., a bake sale, which recipe handler 120 can consider to suggest a baking recipe or cooking recipe based on the ingredients on hand and the time available), upcoming appointments on the calendar (e.g., a meeting, which recipe handler 120 can consider to suggest recipes that can be prepared in the time remaining before the appointment), a dinner party on the calendar which recipe handler 120 can consider to suggest recipes that consider the food preferences/restrictions of each dinner guest, and date proximity to a holiday which recipe handler 120 can consider to suggest recipes associated with the holiday.

Electronic calendar handler 130 may be bi-directional and capable of not only reading the electronic calendar 172, but of updating the electronic calendars 172, for example, to reschedule appointments or send out spur-of-the-moment invitations to friends while the food is cooking. Electronic calendar handler 130 may also communicate with cooking handler 140, described below. Electronic calendar handler 130 may, for example, receive data from cooking handler 140 that indicates the food preparation for a dinner party is not progressing as anticipated. As a result of that data, electronic calendar handler 130 may adjust the arrival time for the dinner party guests, send a calendar update to each guest, and notify each guest that the arrival time has been changed.

In certain embodiments, electronic calendar handler 130 can set an alert on the electronic calendar 172 for a specific time to notify the system user to begin preparing the selected recipe so that the preparation can be completed prior to another event on the electronic calendar 172. Electronic calendar handler 130 can also determine a preparation pace needed to ensure the recipe is prepared within the calculated allotted time and can send that information to cooking handler 140.

In response to the time allotted for preparation information sent by electronic calendar handler 130, recipe handler 120 can, in various embodiments, adjust the suggested recipe to skip certain preparation steps, modify preparation steps, adjust cooking temperatures, or change cooking appliance to hasten the food preparation process when the allotted time is short. Recipe handler 120 can suggest recipes with specific ingredients that can be cooked in the allotted time.

Studies have indicated that specific foods can affect mood. Recipe handler 120 can, in various embodiments, suggest recipes containing mood appropriate food ingredients to alleviate, for example, a sad or stressed mood. The mood of the system user may be determined by sensors and facial recognition software or by direct user input. The mood of a guest may be determined by guest calendar profiles or calendar entry mood indicators in the electronic calendar 172. A guest may enter their mood when accepting a calendar invitation to dinner. A guest may set, for example, a "mood" slider on a GUI (graphical user interface) on the invitation response indicating a current mood or a forecast mood. In certain embodiments, a guest may change their profile and send the change to the cooking facilitation system 100 where electronic calendar handler 130 may receive the changed profile and update the contact profile information in the electronic calendar 172 for that guest.

Once a recipe is selected, cooking handler 140 may retrieve preparation steps corresponding to the selected recipe from the recipe source, i.e., the recipe repository 174, personalized cooking repository 176, or Internet, along with adjustments made by recipe handler 120, and display the steps sequentially to the user. In various embodiments the display presentation may be in the counter top, the cutting board, the oven, a handheld device, or any other device capable of presenting the information. Images of the food at each preparation step may be presented with the preparation step. Images may, in certain embodiments, be projected on the kitchen wall.

Cooking handler 140 may, in various embodiments, monitor the preparation of the selected recipe. Cooking handler 140 may monitor the user's preparation actions, using one or more sensors. Gestures corresponding with the current preparation step can be retrieved from a data store (i.e., the recipe repository 174, the personalized cooking repository 176, or the Internet) along with threshold values corresponding with each of the gestures. For a user whose cooking gestures vary from the retrieved data store gestures by more than the threshold values, cooking handler 140 may, in various embodiments, present a user alert to indicate that the preparation may not be accurate for the recipe. In certain embodiments, cooking handler 140 may provide a suggested correction, for example, to continue mixing ingredients that have not been sufficiently blended. In other embodiments, cooking handler 140 may make more sophisticated corrections when the user deviates from the recipe. Cooking handler 140 may signal recipe handler 120 to "recalculate" the recipe, similar to a GPS recalculation when a wrong turn is taken, using other recipes in the personalized cooking repository 176, recipe repository 174, or the Internet, along with recipe ratings and recipe preferences of the user. Recipe handler 120 may dynamically adjust the recipe or provide suggestions to the user for adjusting subsequent recipe preparation steps in order to correct or compensate for the deviation(s) taken.

In certain embodiments, cooking handler 140 may monitor the recipe preparation pace received from electronic calendar handler 130 to determine if the preparation steps are proceeding as anticipated. If the preparation is slower than anticipated, cooking handler 140 may signal recipe handler 120 to dynamically adjust the recipe to speed up the preparation by, for example, eliminating one or more preparation steps, or increasing cooking temperatures. In certain embodiments, cooking handler 140 may signal electronic calendar handler 130 to notify any guests invited to the meal to delay their arrival.

In various embodiments, cooking handler 140 also monitors the ingredients being added to the recipe to ensure only appropriate ingredients and appropriate quantities of ingredients, based on dietary restrictions, are included. For example, when the main ingredient of a sauce does not violate a dietary restriction, other auxiliary ingredients can be overlooked (e.g., traditional Korean soy sauce does not contain any wheat, however, most factory-made versions do contain wheat). The ability for food identification system 110 to read the label of any ingredient item and communicate with cooking handler 140, enables cooking handler 140 to alert the user of a potential dietary restriction problem.

In various embodiments, cooking handler 140 may identify a kitchen appliance required to cook the food and may communicate with the identified appliance, for example a configurable burner surface or oven, to turn on the burner or preheat the oven to an appropriate temperature.

In certain embodiments, cooking handler 140 can detect and record, in the personalized cooking repository 176, a created recipe and intentional user deviations from the selected recipe. Recorded data may include, but is not limited to, video clips, preparation gestures, weight, quantity, type of ingredients, cooking time, cooking temperature, food images at each preparation step, recipe steps, and voice instruction, all collected by the sensors monitoring the cooking process. In certain embodiments, recipe handler 120 may receive user feedback, for example, from a cooking facilitation system 100 input device such as a touch display screen, on which the user rates the created recipe or the recipe with intentional deviations. Recipe handler 120 may store this rating in the personalized cooking repository 176 with the recipe. Recipe handler 120 may consider the stored ratings when making future recipe suggestions.

In embodiments in which the cooking facilitation system 100 records a created or intentionally deviated from recipe, the system user can edit the recorded details saved by cooking handler 140. Once the user is satisfied with the [multimedia] recipe or "cooking instruction", the user can publish/share it through a publishing feature of electronic calendar handler 130. The publishing feature may share the data with the contacts listed in the electronic calendar 172 or may post the data to the Internet. The shared recipe can include any dietary restrictions and calorie counts associated with the recipe.

Figure 2:
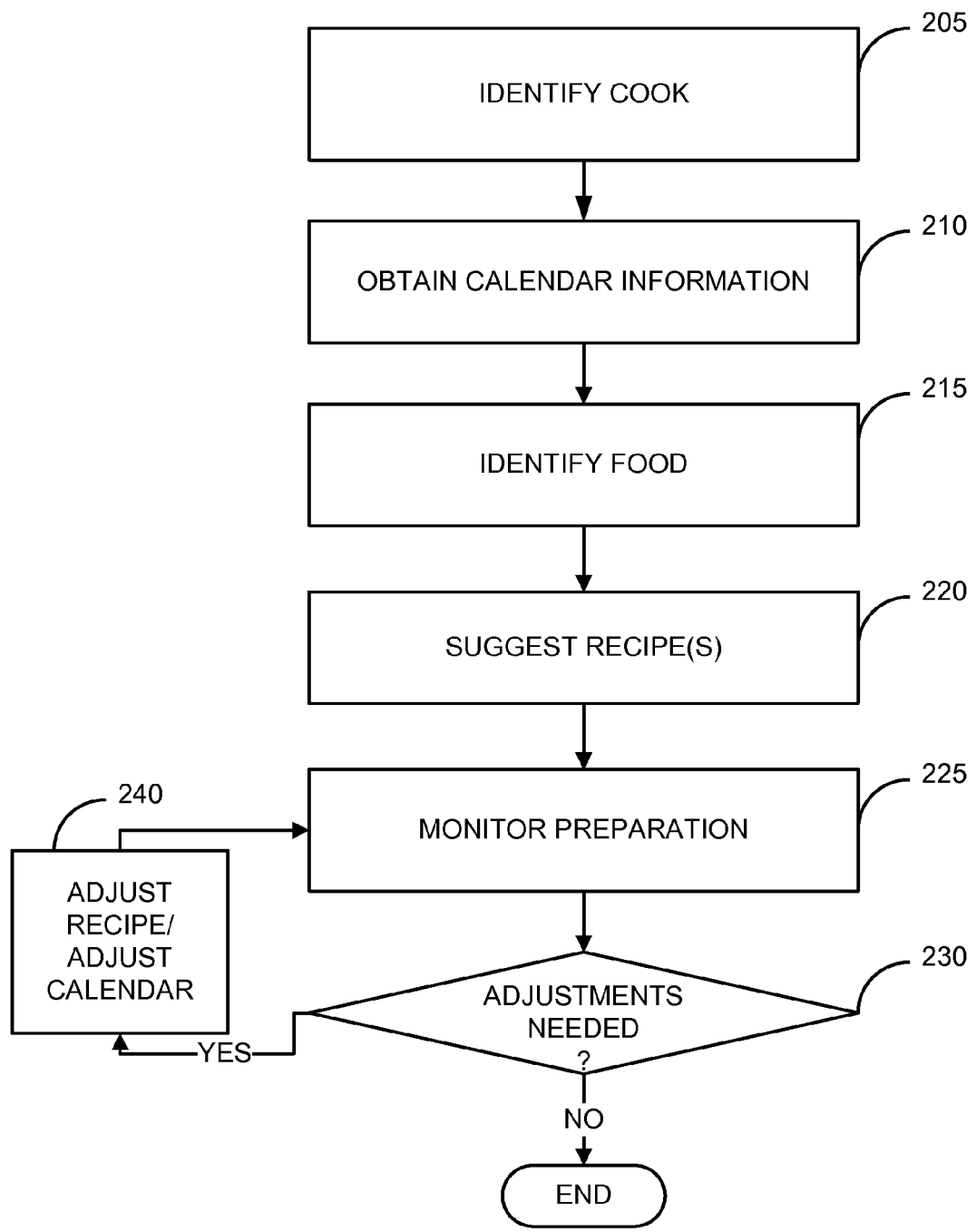
FIG. 2 is a flowchart illustrating a cooking facilitation system with a bi-directional calendar interface to incorporate calendar data into recipe selection and modification, in accordance with an embodiment of the present disclosure.

FIG. 2 is a flowchart illustrating a cooking facilitation system 100 with a bi-directional calendar interface to incorporate calendar data into recipe selection and modification, in accordance with an embodiment of the present disclosure. In various embodiments, the cooking facilitation system 100 determines parameters for selecting a recipe. One of the parameters may include who is doing the cooking. In various embodiments, the cooking facilitation system 100, at 205, identifies the cook requesting a recipe. The cook may be identified through visual sensors and recognition software, through biometric identification, or by manual entry into the cooking facilitation system 100. Information relating to the cook, such as cooking expertise, cooking preferences (including type of appliances preferred), food preferences, food allergies, and preferred electronic calendar 172 may be obtained from the personalized cooking repository 176. The cooking facilitation system, at 210, locates the cook's preferred electronic calendar 172 which may be a local calendar in the cooking facilitation system 100 or may be any known or future local or remote calendar application.

From the obtained electronic calendar 172, the cooking facilitation system 100 determines additional parameters for selecting a recipe, such as preparation time available (if an upcoming appointment is on the electronic calendar 172 entry), favorite meals (if a birthday is indicated on the electronic calendar 172 entry), romantic meals (if an anniversary is indicated on the electronic calendar 172 entry), holiday recipes (if the current date is in proximity to a holiday indicated on an electronic calendar 172 entry, where proximity may be a user defined number of days), calorie counts or recipe ingredients (if invited guests with food restrictions are indicated on the electronic calendar 172 entry). Cooking facilitation system 100 may estimate the desirability for a particular recipe type described above. If the estimated desirability exceeds a threshold value, the recipe type is added as a parameter for recipe selection.

Other parameters for selecting a recipe may include food ingredient availability. Food ingredient availability may be determined, at 215, where cooking facilitation system 100 identifies the food ingredients that are on-hand to prepare a recipe. The food identification system 110 may identify food by scanner, RFID labelling, UPC labelling, optical sensors, weight sensors, an electronic tongue, a moisture sensor, or by manual input through an input device such as a keyboard, mouse, or touch screen. Food ingredient availability parameters may also be dependent on the time of year, as indicated by the calendar date and geo-location of the cooking facilitation system 100, to determine seasonal ingredients that may not be readily available.

Once food ingredient availability parameters, calendar parameters, and who is cooking are determined, cooking facilitation system 100 suggests, at 220, one or more recipes that satisfy the parameters. Recipe handler 120, may modify the recipes to adjust for available preparation time, food ingredient availability, and cook expertise before presenting the suggested recipes. Difficult recipe steps may be simplified, food ingredients may be substituted, recipe steps may be eliminated, or cooking temperatures adjusted.

The cooking handler 140 of the cooking facilitation system 100 monitors, at 225, the recipe preparation. Cooking handler 140 may monitor the preparation by visual sensors or ingredient sensors, such as weight sensors and label scanners, to determine if the recipe preparation steps are proceeding accurately and at the appropriate pace to meet any electronic calendar entry restrictions. If the preparation is not proceeding appropriately, as determined at 230, the cooking facilitation system 100 may, at 240, adjust the recipe to correct ingredient mishaps, modify steps to speed up preparation, or adjust the electronic calendar 172 to reschedule appointments or notify guests, and continue monitoring the adjusted recipe preparation, at 225. If the recipe preparation does not need any adjustment, as determined at 230, the cooking facilitation system 100 processing ends.

Figure 3:
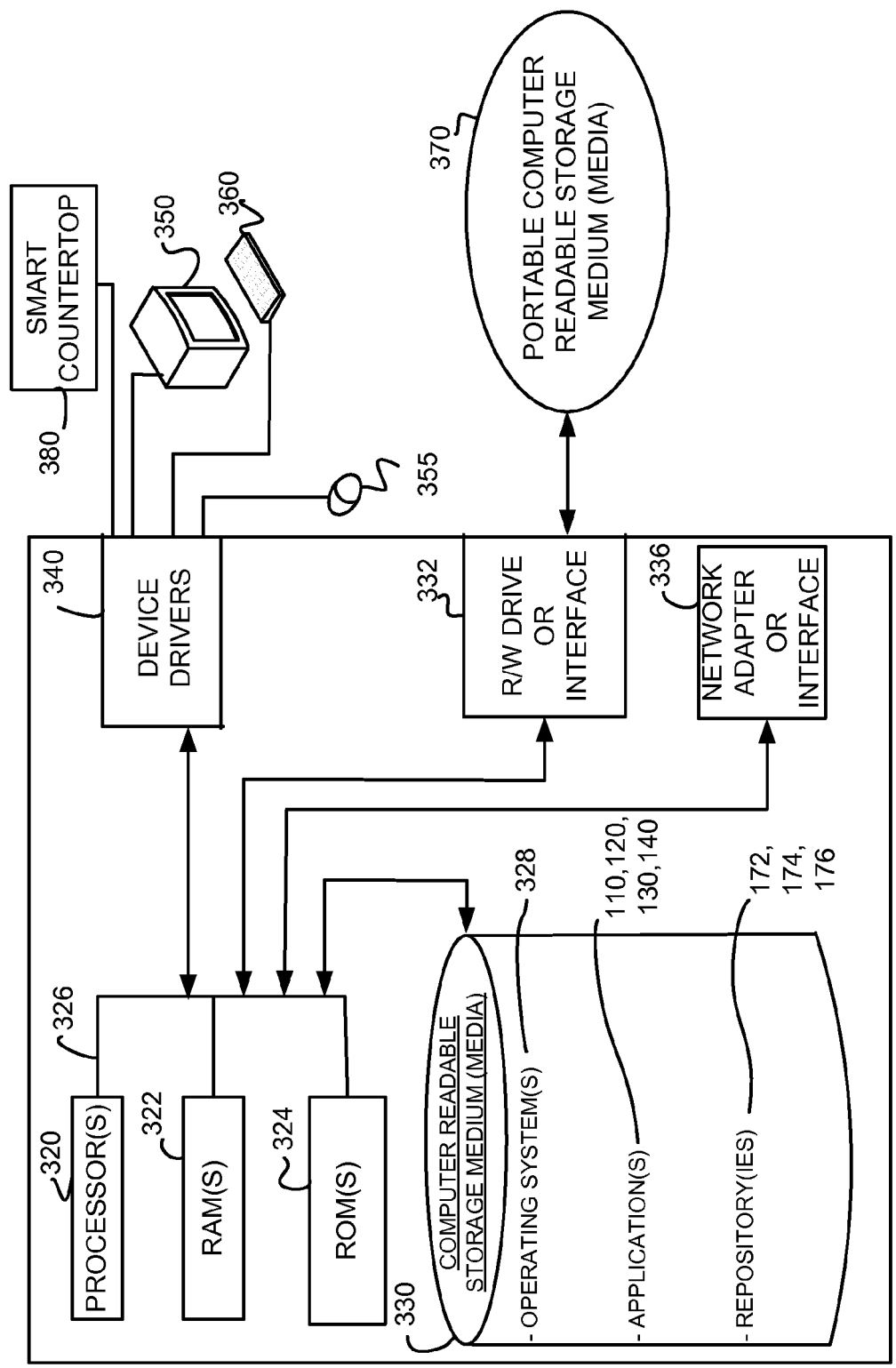
FIG. 3 depicts a block diagram of components of the computing device of FIG. 1, in accordance with an embodiment of the present disclosure.

FIG. 3 depicts a block diagram of components of computing device 122 of FIG. 1, in accordance with an embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 122 can include one or more processors 320, one or more computer-readable RAMs 322, one or more computer-readable ROMs 324, one or more computer readable storage medium 330, device drivers 340, read/write drive or interface 332, and network adapter or interface 336, all interconnected over a communications fabric 326. Communications fabric 326 can be implemented with any architecture designed for passing data and/or control information between processors (such as microprocessors, communications and network processors, etc.), system memory, peripheral devices, and any other hardware components within a system.

One or more operating systems 328, applications: food identification system 110, recipe handler 120, electronic calendar handler 130, cooking handler 140, and repositories: electronic calendar 172, recipe repository 174, and personalized cooking repository 176 are stored on one or more of the computer-readable storage medium 330 for execution by one or more of the processors 320 via one or more of the respective RAMs 322 (which typically include cache memory). In the illustrated embodiment, each of the computer readable storage medium 330 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 332 to read from and write to one or more portable computer readable storage medium 370. Food identification system 110, recipe handler 120, electronic calendar handler 130, cooking handler 140, electronic calendar 172, recipe repository 174, and personalized cooking repository 176 can be stored on one or more of the portable computer readable storage medium 370, read via the respective R/W drive or interface 332, and loaded into the respective computer readable storage medium 330.

Computing device 122 can also include a network adapter or interface 336, such as a TCP/IP adapter card or wireless communication adapter (such as a 4G wireless communication adapter using OFDMA technology). Food identification system 110, recipe handler 120, electronic calendar handler 130, cooking handler 140, electronic calendar 172, recipe repository 174, and personalized cooking repository 176 can be downloaded to the computing device from an external computer or external storage device via a network (for example, the Internet, a local area network or other, wide area network or wireless network) and network adapter or interface 336. From the network adapter or interface 336, the programs are loaded into the computer readable storage medium 330. The network may comprise copper wires, optical fibers, wireless transmission, routers, firewalls, switches, gateway computers, and/or edge servers.

Computing device 122 can also include a smart countertop 380, a display screen 350, a keyboard or keypad 360, and a computer mouse or touchpad 355. Device drivers 340 interface to smart countertop 380 for food identification, display screen 350 for imaging, to keyboard or keypad 360, to computer mouse or touchpad 355, and/or to display screen 350 for pressure sensing of alphanumeric character entry and user selections. The device drivers 340, R/W drive or interface 332, and network adapter or interface 336 can comprise hardware and software (stored in computer readable storage medium 330 and/or ROM 324).

Figure 4:
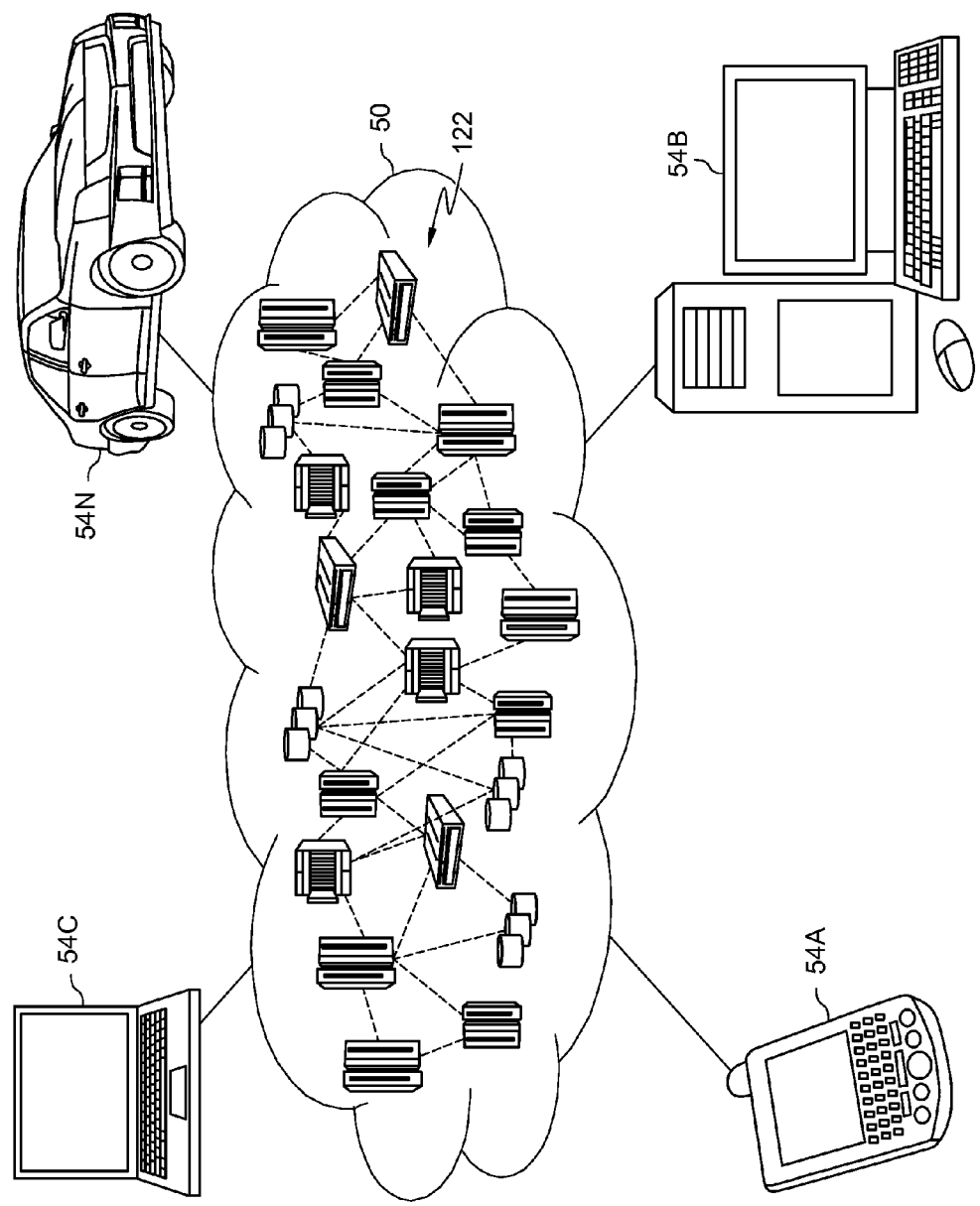
FIG. 4 depicts a cloud computing environment including the computing device of FIGS. 1 and 3, in accordance with an embodiment of the present disclosure.

Referring now to FIG. 4, illustrative cloud computing environment 50 is depicted. As shown, cloud computing environment 50 comprises one or more cloud computing nodes 122 with which local computing devices used by cloud consumers, such as, for example, personal digital assistant (PDA) or cellular telephone 54A, desktop computer 54B, laptop computer 54C, and/or automobile computer system 54N may communicate. Nodes 122 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 122 and cloud computing environment 50 can communicate with any type of computerized device over any type of network and/or network addressable connection (e.g., using a web browser).

Figure 5:
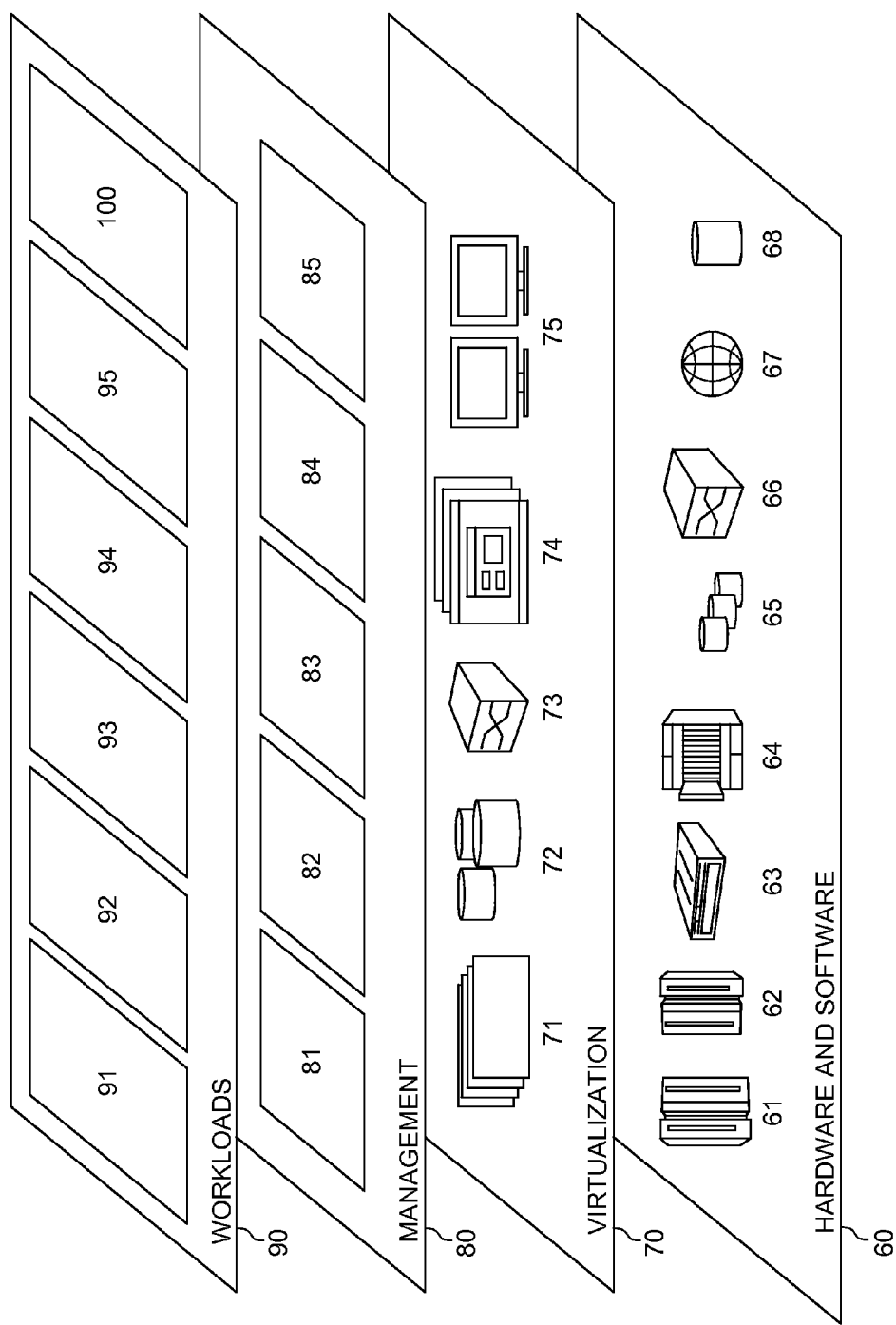
FIG. 5 depicts abstraction model layers of the cloud computing environment of FIG. 4, in accordance with an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cooking facilitation system 100.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for recommending a recipe and monitoring preparation of the recipe according to a calendar, the method comprising:
   receiving, by a computer, calendar data that includes one or more of:
      a date;
      scheduled appointment times for the date and appointment durations;
      any special events on the date; and
      proximity of the date to a holiday;
   identifying, by the computer, one or more recipes that can be prepared in an available time slot in the calendar, wherein the one or more recipes includes a list of food from a food ingredient list;
   monitoring, by the computer, data associated with the preparation of a selected recipe, wherein the data includes a length of time to complete a preparation step of the selected recipe and the data is obtained via an optical identifier activated by a motion detector, and wherein the motion detector activates a light source for lighting a field of vision for the optical identifier;

in response to detecting the length of time increasing by more than a threshold value, adjusting, by the computer, one or more of:
  one or more subsequent preparation steps of the selected recipe to compensate for the detected increase to the length of time; and
  the calendar to provide a longer available time for recipe preparation; and in response to adjusting the one or more subsequent preparation steps, displaying, via a graphical user interface, the one or more subsequent preparation steps along with an alert depicting a potential dietary restriction and a plurality of images depicting the food ingredient list corresponding to the displayed one or more subsequent preparation steps, wherein the plurality of displayed images are retrieved from an online recipe repository, an online cooking repository, and the internet and wherein the depicted potential dietary restriction alert corresponds to a user profile associated with the received calendar data.

2. The method according to claim 1 further comprising:
setting, by the computer, a calendar entry within the available time slot that produces an alert to begin recipe preparation.

3. The method according to claim 1,
wherein receiving, by the computer, calendar data further comprises receiving calendar contact data for invitees included in a scheduled appointment in the calendar; and
wherein adjusting, by the computer, the calendar further comprises sending, by the computer, an updated appointment time to the calendar of each invitee.

4. The method according to claim 1,
wherein the monitored data associated with the preparation of the selected recipe further includes:
  a list of ingredients included in the preparation of a recipe step; and
  a quantity of each ingredient in the list of ingredients included in the preparation of the recipe step.

5. The method according to claim 1,
wherein the monitored data associated with the preparation of the selected recipe further includes:
  a gesture identified during the preparation of a recipe step; and
  a duration of the identified gesture.

6. The method according to claim 4, further comprising:
in response to one or more of:
  the list of ingredients included in the preparation of a recipe step deviating by more than a threshold value from the recipe step; and
  the quantity of an ingredient included in the preparation of the recipe step deviating by more than a threshold value from the recipe step,
adjusting, by the computer, one or more of:
  one or more subsequent preparation steps of the selected recipe to compensate for the deviation; and
  the calendar to provide a longer available time for recipe preparation to compensate for the adjusted preparation steps.

7. The method according to claim 1,
wherein a recipe further includes a recipe type comprising one or more of:
  holiday recipe;
  vegan recipe;
  restricted ingredient recipe; and
  mood affecting recipe; and
wherein identifying, by the computer, the one or more recipes further comprises:
  estimating, by the computer, a desire for a recipe type based on the special event on the date or the proximity of the date to a holiday; and
  responsive to the estimate exceeding a threshold value, identifying, by the computer, one or more recipes that are the desired recipe type.

8. The method according to claim 7, wherein estimating, by the computer, a desire for a recipe type further comprises:
estimating, by the computer, a desire for a recipe type based on a profile data of an invitee included in the scheduled appointment in the calendar, wherein the invitee profile data includes one or more of:
  a recipe type preference; and
  a mood.

9. The method according to claim 1, further comprising sending, by the computer, a calendar appointment invitation to one or more calendar contacts.

10. The method according to claim 1, wherein adjusting, by the computer, one or more subsequent preparation steps of the selected recipe to compensate for the increase to the length of time further comprises adjusting, by the computer, a cooking temperature.

11. A computer system for recommending a recipe and monitoring preparation of the recipe according to a calendar, the computer system comprising one or more processors, one or more computer readable memories, one or more computer readable storage medium, and program instructions stored on at least one of the one or more storage medium for execution by at least one of the one or more processors via at least one of the one or more memories, the program instructions comprising:
  program instructions to receive, by a computer, calendar data that includes one or more of:
    a date;
    scheduled appointment times for the date and appointment durations;
    any special events on the date; and
    proximity of the date to a holiday;
  program instructions to identify, by the computer, one or more recipes that can be prepared in an available time slot in the calendar, wherein the one or more recipes includes a list of food from a food ingredient list;
  program instructions to monitor, by the computer, data associated with the preparation of a selected recipe, wherein the data includes a length of time to complete a preparation step of the selected recipe and the data is obtained via an optical identifier activated by a motion detector, and wherein the motion detector activates a light source for lighting a field of vision for the optical identifier;
  in response to detecting the length of time increasing by more than a threshold value, program instructions to adjust, by the computer, one or more of:
    one or more subsequent preparation steps of the selected recipe to compensate for the detected increase to the length of time; and
    the calendar to provide a longer available time for recipe preparation; and
  in response to adjusting the one or more subsequent preparation steps, program instructions to display, via a graphical user interface, the one or more subsequent preparation steps along with an alert depicting a potential dietary restriction and a plurality of images depicting the food ingredient list corresponding to the displayed one or more subsequent preparation steps, wherein the plurality of displayed images are retrieved from an online recipe repository, an online cooking repository, and the internet and wherein the depicted potential dietary restriction alert corresponds to a user profile associated with the received calendar data.

12. The computer system according to claim 11, further comprising:
   program instructions to set, by the computer, a calendar entry within the available time slot that produces an alert to begin recipe preparation.

13. The computer system according to claim 11,
   wherein program instructions to receive, by the computer, calendar data further comprises program instructions to receive calendar contact data for invitees included in a scheduled appointment in the calendar; and
   wherein program instructions to adjust, by the computer, the calendar further comprises program instructions to send, by the computer, an updated appointment time to the calendar of each invitee.

14. The computer system according to claim 11,
   wherein the monitored data associated with the preparation of the selected recipe further includes:
      a list of ingredients included in the preparation of a recipe step; and
      a quantity of each ingredient in the list of ingredients included in the preparation of the recipe step.

15. The computer system according to claim 11,
   wherein the monitored data associated with the preparation of the selected recipe further includes:
      a gesture identified during the preparation of a recipe step; and
      a duration of the identified gesture.

16. The computer system according to claim 14, further comprising:
   in response to one or more of:
      the list of ingredients included in the preparation of a recipe step deviating by more than a threshold value from the recipe step; and
      the quantity of an ingredient included in the preparation of the recipe step deviating by more than a threshold value from the recipe step,
   program instructions to adjust, by the computer, one or more of:
      one or more subsequent preparation steps of the selected recipe to compensate for the deviation; and
      the calendar to provide a longer available time for recipe preparation to compensate for the adjusted preparation steps.

17. The computer system according to claim 11,
   wherein a recipe further includes a recipe type comprising one or more of:
      holiday recipe;
      vegan recipe;
      restricted ingredient recipe; and
      mood affecting recipe; and
   wherein program instructions to identify, by the computer, the one or more recipes further comprises:
      program instructions to estimate, by the computer, a desire for a recipe type based on the special event on the date or the proximity of the date to a holiday; and
      responsive to the estimate exceeding a threshold value, program instructions to identify, by the computer, one or more recipes that are the desired recipe type.

18. The computer system according to claim 17, wherein program instructions to estimate, by the computer, a desire for a recipe type further comprises:
   program instructions to estimate, by the computer, a desire for a recipe type based on a profile data of an invitee included in the scheduled appointment in the calendar, wherein the invitee profile data includes one or more of:
      a recipe type preference; and
      a mood.

19. The computer system according to claim 11, further comprising program instructions to send, by the computer, a calendar appointment invitation to one or more calendar contacts.

20. The computer system according to claim 11, wherein program instructions to adjust, by the computer, one or more subsequent preparation steps of the selected recipe to compensate for the increase to the length of time further comprises program instructions to adjust, by the computer, a cooking temperature.

* * * * *